(12) United States Patent
Webb et al.

(10) Patent No.: US 8,380,071 B2
(45) Date of Patent: Feb. 19, 2013

(54) REPEATER SURGE COIL AND DIODE CHAIN DESIGN

(75) Inventors: Steven M. Webb, Gravesend (GB); Gerhard W. Van Lochem, Maldon (GB)

(73) Assignee: Xtera Communications Ltd., Romford (GB)

( * ) Notice: Subject to any disclaimer, the term of this patent is extended or adjusted under 35 U.S.C. 154(b) by 774 days.

(21) Appl. No.: 12/090,040

(22) PCT Filed: Oct. 12, 2006

(86) PCT No.: PCT/GB2006/003800
§ 371 (c)(1), (2), (4) Date: Sep. 8, 2008

(87) PCT Pub. No.: WO2007/042820
PCT Pub. Date: Apr. 19, 2007

(65) Prior Publication Data
US 2008/0317470 A1    Dec. 25, 2008

(30) Foreign Application Priority Data

Oct. 12, 2005 (GB) .................................. 0520741.0
Oct. 12, 2005 (GB) .................................. 0520742.8

(51) Int. Cl.
*H04B 3/36* (2006.01)
*H04B 3/44* (2006.01)

(52) U.S. Cl. ............. 398/105; 398/11; 398/18; 398/173

(58) Field of Classification Search .................... 398/11, 398/18, 173, 105; 340/425.2; 315/74, 119, 315/306; 372/38.07, 38.09
See application file for complete search history.

(56) References Cited

U.S. PATENT DOCUMENTS

| 5,222,010 | A | * | 6/1993 | Capan ........................... 361/56 |
| 5,521,573 | A | * | 5/1996 | Inoh et al. ..................... 336/180 |
| 5,841,205 | A | * | 11/1998 | Webb ............................. 307/130 |
| 6,853,264 | B2 | * | 2/2005 | Bennett et al. ................ 333/17.2 |
| 6,914,508 | B2 | * | 7/2005 | Ferencz et al. ............... 336/200 |
| 2002/0190689 | A1 | * | 12/2002 | Nakamura et al. .......... 320/102 |
| 2005/0116021 | A1 | * | 6/2005 | O'Dougherty et al. ....... 235/375 |

FOREIGN PATENT DOCUMENTS

| GB | 2287625 |   | 9/1995 |
| JP | 02292881 | * | 12/1990 |
| JP | 03-283482 |   | 12/1991 |
| JP | 08-097692 |   | 4/1996 |
| JP | 11-027168 |   | 1/1999 |
| JP | 2004-274247 |   | 9/2004 |
| JP | 2006-273635 |   | 10/2006 |

OTHER PUBLICATIONS

The International Search Report of the International Searching Authority (European Patent Office) issued Jan. 24, 2007.

* cited by examiner

*Primary Examiner* — Jessica Stultz
*Assistant Examiner* — Michael Carter
(74) *Attorney, Agent, or Firm* — Workman Nydegger

(57) ABSTRACT

There are provided surge protection devices for undersea optical repeaters. An optical repeater drive circuit incorporating a diode chain design includes a diode array formed of a plurality of banks of two or more parallel forward-biased diodes, each diode in a given bank being in electrical contact with all the diodes in adjacent banks; and, optical repeater control circuitry connected in parallel with the diode array. A component for providing surge protection to an optical repeater incorporates a substrate formed of an insulating material and a first substantially planar conducting coil embedded within the substrate.

12 Claims, 8 Drawing Sheets

REPEATER SURGE COIL AND DIODE CHAIN DESIGN

FIELD OF THE INVENTION

The present invention relates to the protection of optical repeater circuitry from surge currents, and in particular to the protection of optical repeater circuitry in long haul marine transmission systems.

BACKGROUND TO THE INVENTION

A typical optically amplified undersea cable system employs a number of optical repeaters and thus requires a power supply for operation. For conventional systems each repeater requires circa 30V at 1 A, and the system may contain as many as 200 repeaters on a typical 6000 km trans-Atlantic application. To power the ensemble of repeaters a series connection technique is chosen using a constant current supply and earth return. Typically cable resistances are circa 1 Ohm/km and as such a total voltage would be 6 kV for the cable resistive losses and 6 kV for the repeaters of the above example. Voltage clamping in each repeater is used to extract operational current and bypass the excess—allowing for any repeater ageing or line current fluctuation, whilst maintaining a nominally constant voltage within the repeater for its control circuitry.

The use of a local earth return at the Power Feeding Equipment (PFE), allows for greater power efficiency than by using an isolated return current cable. For instance a typical earth may be 10 Ohms so dropping 10V at each station if the line current is 1 A, where-as a return cable would be 6000 Ohm dropping 6 kV total, entailing a higher supply system voltage and additional costs associated with a return cable, and also there is the cost of additional copper The example described gives a total line voltage of 12 kV. Such a substantial voltage is undesirable due to additional insulation requirements and stresses on the system elements. FIG. 1 illustrates a typical implementation, where here two PFE's are installed, one supplying +6 kV and the other −6 kV, each at 1 A. Thus half the maximum 12 kV is rendered on any system element. In addition a single PFE failure may be overcome by temporarily increasing the voltage of the remaining one to maintain system operation until repair may be undertaken.

Submarine cable is typically coaxial containing a power member surrounded by insulation and then an optional outer earthed screen which in turn will be in contact with seawater. The structure typically has a capacitance of 0.2 uF/km and characteristic impendence of around 28 Ohms. These features have to be carefully considered in the design, particularly with high voltage with regards to damage protection of repeaters from cable faults or current surges from shore end lightning strikes.

The large line voltages discussed above lead to significant stress on repeater components. Components capable of dealing with such voltages are typically large, and repeaters containing them are correspondingly large. This is a significant expense when considering undersea repeaters.

For example, conventionally, repeater circuitry is protected from current surges by Zener diodes connected in parallel to the control circuitry of the repeater and also by the provision of air cored coil inductors. However, these components are necessarily large (in view of the voltages and possible surge currents involved) and are unsuitable for the provision of miniaturised repeaters.

SUMMARY OF THE INVENTION

According to one aspect of the present invention, there is provided an optical repeater drive circuit, the circuit comprising:
 a diode array formed of a plurality of banks of two or more parallel forward-biased diodes, each diode in a given bank being in electrical contact with all the diodes in adjacent banks; and,
 optical repeater control circuitry connected in parallel with the diode array.

The array of diodes of the present invention prevents the control circuitry being exposed to large surge currents. The nature of the array ensures that the failure of any one diode does not leave the array in either open or short circuit, regardless of whether the diode fails so as to present an open or short circuit itself. The required diodes are available as miniaturised components that may be disposed on a printed circuit board (PCB), thereby enabling the overall size of the repeater to be substantially reduced in comparison with prior art techniques.

Preferably, the present invention further comprises a secondary path connected in parallel to both the array and the control circuitry, the secondary path comprising one or more reverse-biased diodes. This enables surge currents that occur in the reverse direction to the operating line current to be handled without damage to other components.

Preferably, the secondary path comprises an array of reverse biased diodes, the array being formed of a plurality of banks of two or more parallel reverse-biased diodes, each diode in a given bank being in electrical contact with all the diodes in adjacent banks. An array of this type ensures that the secondary path continues to function effectively when one of the reverse diodes fails, whether that failure results in an open or short circuit at the point of that diode.

In a preferred embodiment, there is further provided a clamp zener diode connected in parallel with the array and the control circuitry, and one or more filter coils in series with the clamp zener diode. The clamp zener diode places an upper limit on magnitude of the voltage across the repeater circuitry, while the filter coils provide inductive protection to the clamp zener diodes, thereby reducing the magnitude of current passing through the clamp zener diode during a surge current event. As a result, the clamp zener diode need not be capable of surviving high currents, thereby reducing the size of the required clamp zener diode.

Preferably, the forward biased diodes are rectifier diodes. In one preferred embodiment, the voltage drop across the array is 3.6V. Preferably, the voltage across each of the forward biased diodes is 0.6V.

According to a second aspect of the present invention, there is provided an optical repeater comprising one or more optical repeater drive circuits according to the first aspect. In some preferred embodiments a plurality of optical repeater drive circuits are connected in series such that the potential across the optical repeater control circuit in each drive circuit equals the potential across the diode array in that circuit. This allows a number of optical amplifiers to be operated by one repeater unit (as such, a single unit may act as a repeater for more than one fibre, or in more than one direction, or both). Preferably the optical repeater further comprises one or more surge coils in series with the circuit, the surge coils comprising a substrate formed of an insulating material and a first substantially planar conducting coil embedded within the substrate. Preferably, the one or more surge coils further comprise a second substantially planar conducting coil embedded within the substrate, the first and second coils lying in distinct parallel planes and being magnetically coupled to each other. Preferably, the first coil is electrically connected to an electrical input of the optical repeater and the second coil is electrically connected to an electrical output of the repeater.

According to a third aspect of the present invention, there is provided a component for providing surge protection to an optical repeater, the component comprising a substrate formed of an insulating material and a first substantially planar conducting coil embedded within the substrate. The component of this aspect of the present invention provides a miniaturised alternative to conventional inductor coils. In particular, it is significantly smaller than the air-cored coils conventionally used in undersea optical repeaters. This allows the size of the overall optical repeater to be substantially reduced. Moreover, the present invention provides an inductor that is substantially cheaper and easier to fabricate than conventional induction coils.

Preferably, the component further comprises a second substantially planar conducting coil embedded within the substrate, the first and second coils lying in distinct parallel planes and being magnetically coupled to each other. The presence of two coils in a single substrate not only reduces the physical space used as compared to two separate coils, but, since they are magnetically coupled, each coil provides significantly more induction. This further protects the optical repeater from large surge currents without the need to increase the number of turns in the coils, and therefore without having to increase the size of the component.

Preferably, the substrate is a PCB. More preferably, the PCB comprises Flame Resistant 4 (FR-4). In one preferred embodiment, the coils comprise approximately 20 turns and lie within a rectangle having sides of 50 mm and 120 mm.

According to a fourth aspect of the present invention, there is provided an optical repeater comprising the component of the third aspect. Preferably, the first and second coils are connected to an electrical input and an electrical output of the optical repeater respectively. Connection of the coils in this way ensures that the discharge behaviour of the repeater is the same regardless of whether a fault causes current to discharge towards the input of the repeater or the output. In particular, discharge current due to stray capacitance in the optical repeater is handled equivalently in each circumstance.

Preferably, the optical repeater of the fourth aspect further comprises one or more optical repeater drive circuits, the circuits each comprising: an array formed of a plurality of banks of two or more parallel forward-biased diodes, each diode in a given bank being in electrical contact with all the diodes in adjacent banks; and, optical repeater control circuitry connected in parallel to the array. The optical repeater preferably further comprises a reverse path connected in parallel to both the array and the control circuitry, the reverse path comprising one or more reverse-biased diodes.

BRIEF DESCRIPTION OF THE DRAWINGS

Examples of the present invention will now be described in detail with reference to the accompanying drawings, in which.

DETAILED DESCRIPTION

Figure 1:
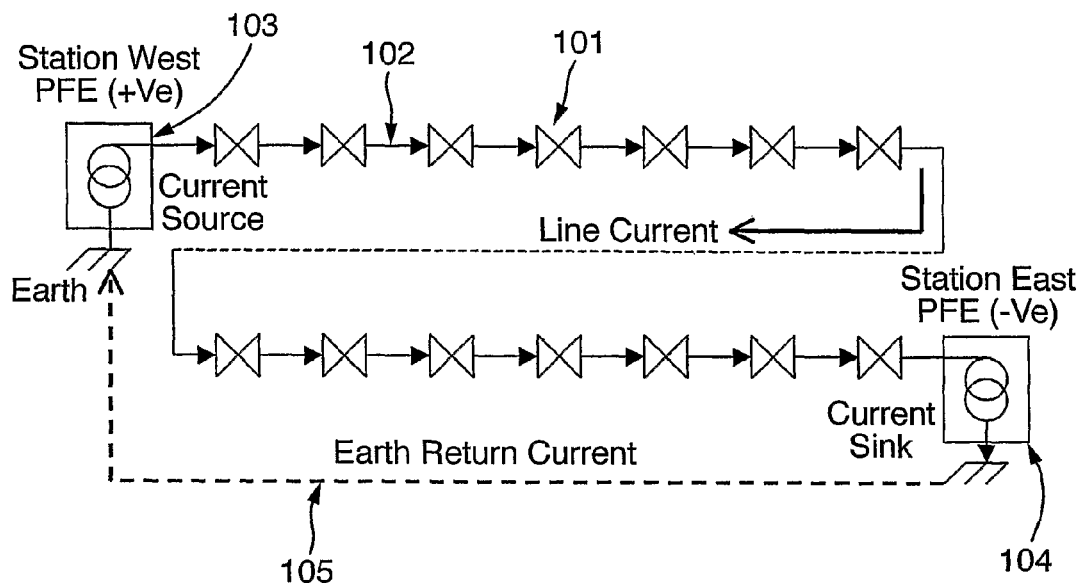
FIG. 1 shows a schematic representation of a typical power feeding system for repeaters in an undersea optical communications network.

FIG. 1 shows a broad schematic of a typical undersea optical communications system. A cable 102 runs between the two endpoints (in the example, West station 103 and East station 104) carrying a line current for operating a number of optical repeaters 101. The circuit is completed by an earth return current 105.

Figure 2:
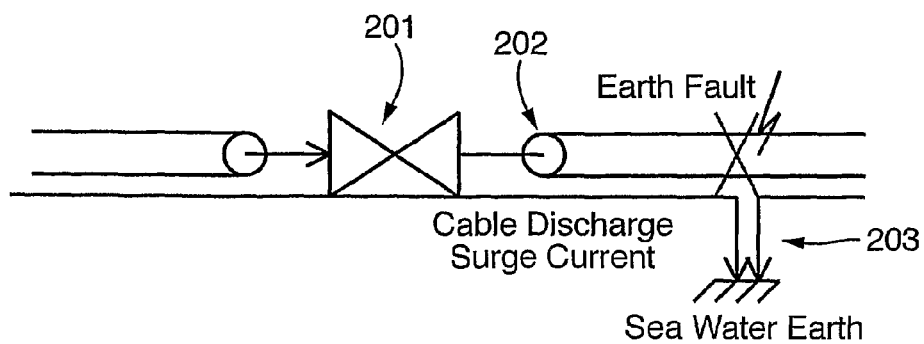
FIG. 2 illustrates a cable fault scenario giving rise to a forward surge current.
Figure 3:
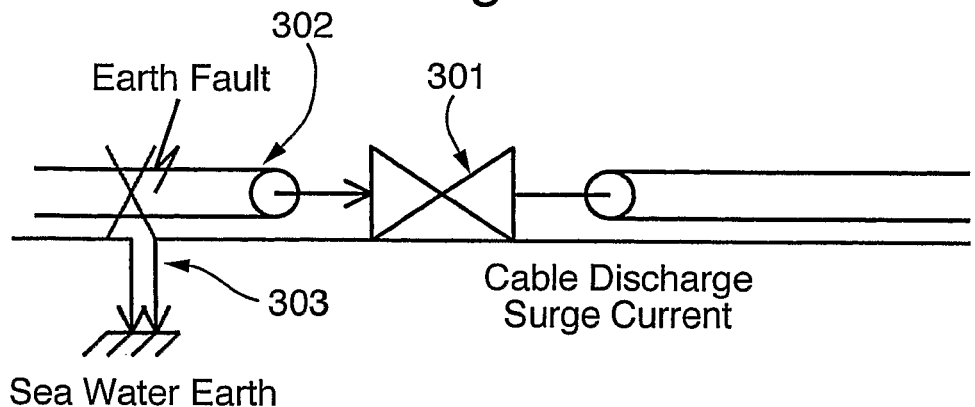
FIG. 3 illustrates a cable fault scenario giving rise to a reverse surge current.

FIG. 2 shows a repeater 201 at a positive line potential when a fault 203 occurs in cable 202. This fault earths the cable causing a peak current through the repeater that can be approximated (for a nearby fault) as the local line voltage divided by the characteristic impedance of the submarine cable. For example, a line voltage of 6 kV and a characteristic impedance of 28 Ohms would lead to a maximum current of approximately 214 A. FIG. 3 shows a similar fault 303, this time occurring in the cable 302 on the other side of the repeater 301. Again, a large discharge current would be expected to pass through the repeater, though this time in the reverse direction.

Although the faults shown in FIGS. 2 and 3 occur rarely (when they do occur, it is typically a result of fishing activity in the area), replacement of the repeater electronics is both expensive and time-consuming, and it is therefore desirable to design repeaters to be able to withstand the surge currents described above. In particular, some sensitive repeater components must be protected from these large current surges.

Figure 4:
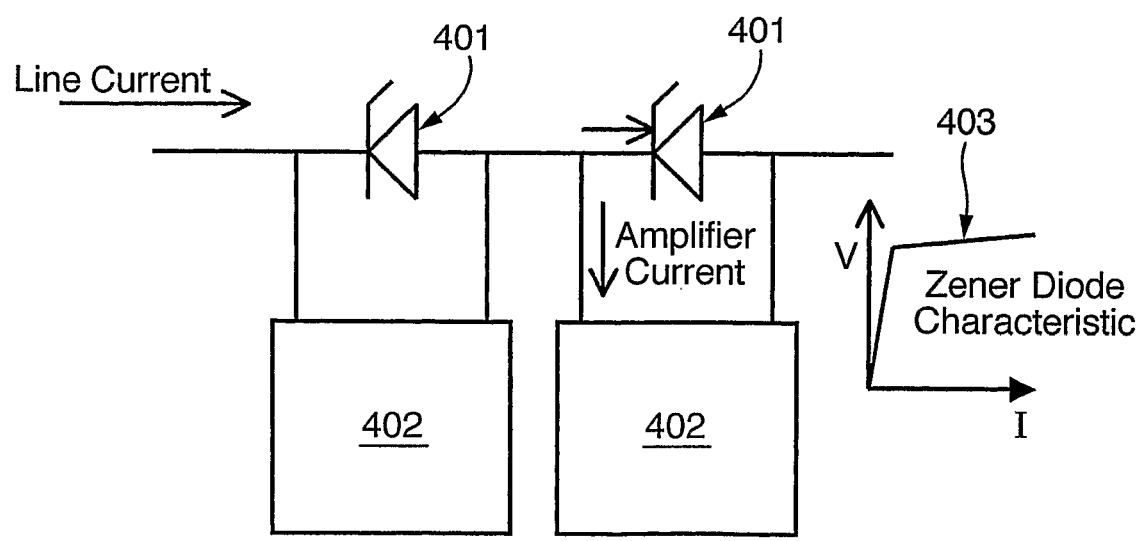
FIG. 4 shows a prior art repeater power separation circuit design incorporating Zener diodes.

FIG. 4 illustrates a prior art technique of regulating the current passing through the sensitive repeater electronics. In this architecture, high power Zener diodes 401 are connected in parallel with the optical amplifier control electronics 402. The Zeners have a voltage-current (V-I) characteristic response 403. The Zener is used to clamp a section of the supply voltage to its associated control electronics. The majority of the line current passes through the control electronics and is ultimately used to drive the pump lasers, while the rest is bypassed through the Zener as would be expected from the diode's V-I characteristic 403. As the pump lasers age their demand current increases and less supply current is bypassed. The current passing through the Zener also provides a buffer to maintain adequate system operation if the line current drops slightly for any reason (for example, a PFE fault).

The faults shown in FIGS. 2 and 3 will cause two broad types of surge current, referred to hereinafter as 'forward' and 'reverse' surge currents respectively. A forward surge current is one that propagates in the direction of the normal line current, that is from left to right in FIG. 4. A reverse surge current propagates in the opposite direction. In the event of a forward surge current the V-I characteristic of the Zener diode shown in FIG. 4 ensures that it, rather than the control electronics, bears the surge current. In the event of a reverse surge current, the Zener substantially acts as a short circuit and again the Zener bears the current rather than the control electronics. It is important that the diode not only bears the current in the event of a fault but also survives this event to function effectively once the cable is repaired. In this case, this requires the Zener to be capable of handling surges of hundreds of amps without damage. This requirement is somewhat unusual and has been addressed by the production of custom Zener diodes. However, these custom diodes are both expensive and physically large. Smaller Zener diodes, though available, are not able to withstand surge currents of this magnitude.

The size of the Zener diodes contributes to the overall size of the repeater. In particular, their typical size means that repeaters currently require large bespoke housing. It would be advantageous to create a smaller repeater. In particular, joint housings used to connect sections of cable are currently not used for this task and it would be beneficial to incorporate a repeater into these relatively small units.

Moreover, the Zener diodes currently available for this task are typically optimised around 5.6V while an optical amplifier pump laser typically requires no more than 2.5V to function. The use of a higher 5.6V supply rail is both inefficient (wasted power=(5.6V−2.5V)*1 A=3.1 W) and also leads to greater system voltages. Large system voltages cause further difficulties in miniaturising repeater design, since they require increased voltage clearances and higher current diodes.

Figure 5:
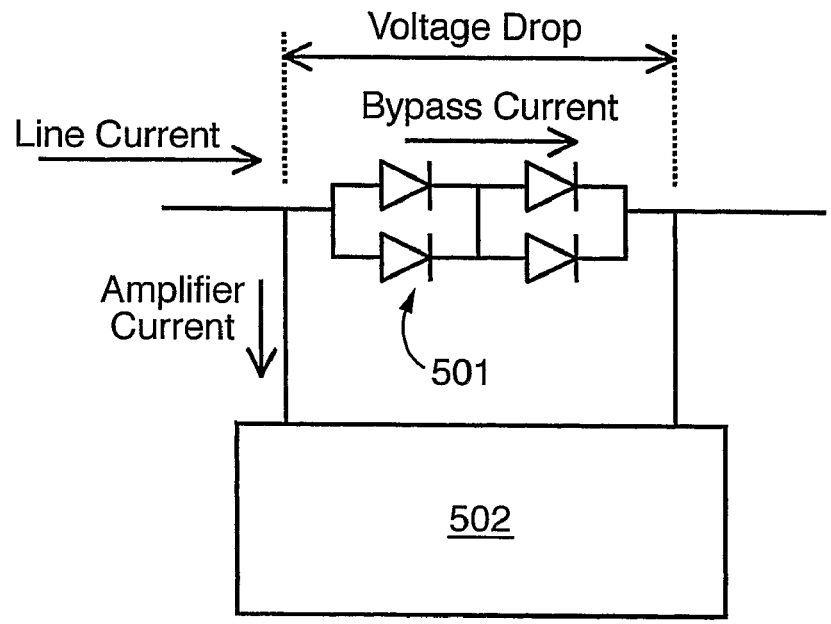
FIG. 5 shows a power rectifier diode array according to the present invention.

FIG. 5 illustrates an arrangement that addresses the problems mentioned above. A laddered array of forward-biased rectifier diodes 501 is used to emulate the V-I characteristic response of a Zener diode. As previously, this array is connected in parallel with the control electronics 502. In a preferred embodiment, the diodes 501 are silicon power rectifier diodes manufactured by International Rectifier, part number 8EWF, having a nominal forward voltage drop of 0.6V. The minimum laddered array is illustrated in FIG. 5, and consists of a 2 by 2 matrix of diodes. According to this arrangement, the failure of any one diode (whether that failure causes the diode to go either open or short circuit) will not either short the circuit or leave no voltage drop across the control electronics.

Figure 6:
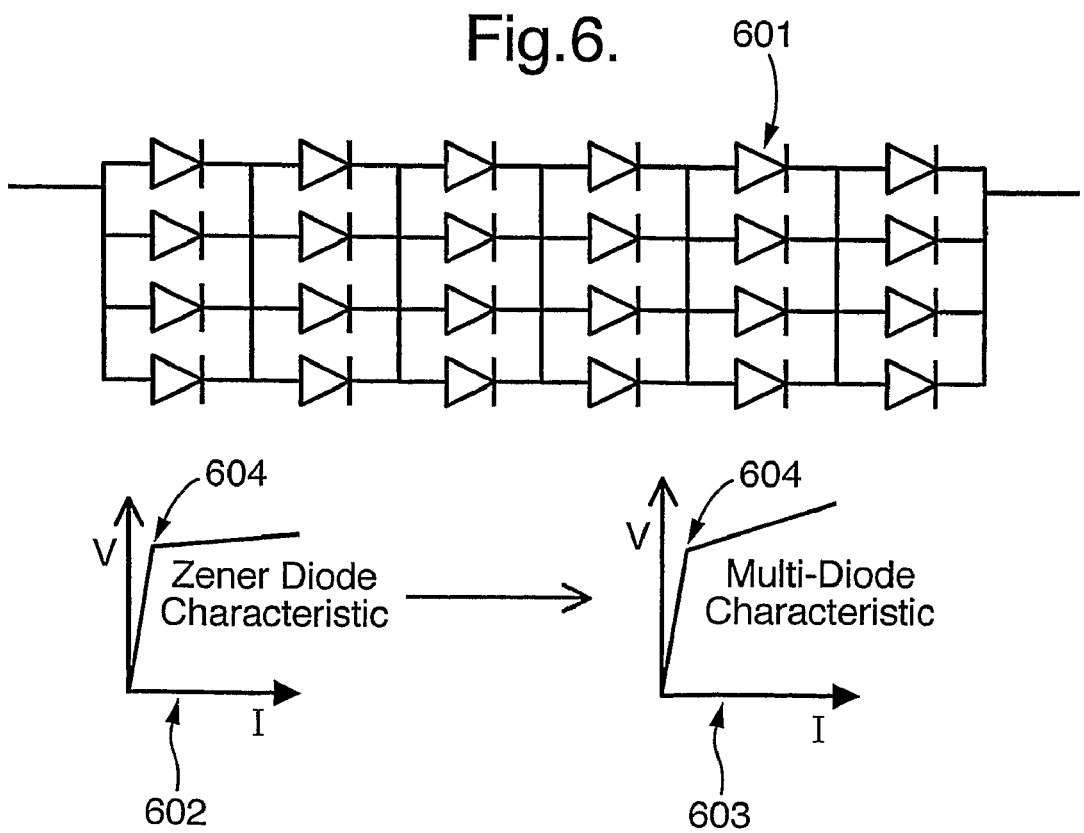
FIG. 6 shows a diode array according to a preferred embodiment of the present invention.

As stated previously, pump lasers typically require 2.5V. In practice it is beneficial to provide some headroom over this voltage for a control margin within the drive transistor. This headroom may typically be in the order of 0.4V. While FIG. 5 illustrated the minimum array of rectifier diodes, FIG. 6 illustrates a suitable array 601 in these circumstances. The diodes are arranged as six series banks of four parallel diodes, with every diode in a given bank being in electrical contact with every diode in the adjacent banks. Each diode shown in FIG. 6 provides a forward drop of 0.6V, and accordingly the combined forward drop of six series connected diodes is 3.6V. This provides redundancy should any one of the diodes fail and go short circuit (since the overall voltage drop would then be 3V, still above the minimum required for the pump laser and the headroom). The banks of parallel diodes ensure that an open circuit failure of any individual diode does not cause the array to go open circuit as a whole.

FIGS. 5 and 6 illustrate two exemplary arrays of rectifier diodes (2 by 2 and 6 by 4 respectively) according to the presently described technique. They share the property that failure of any individual diode either open or short circuit does not cause the overall array to go either open or short circuit. Other arrays sharing this property are envisaged. This property is guaranteed by providing that more than one series (to provide for open circuit failure) banks of more than one parallel (to provide for short circuit failure) diodes is provided, where the array is laddered such that current may flow through any combination of the diodes in each bank.

FIG. 6 also shows the V-I characteristic 602 of the array of forward-biased diodes as against the Zener diode V-I characteristic 603 also shown in FIG. 4. As shown, the array has substantially the same characteristic as the Zener diode, though the slope of the V-I curve after the critical point 604 is somewhat steeper. As such, a large current may produce an undesirable increase in the voltage across the control electronics.

Figure 11:
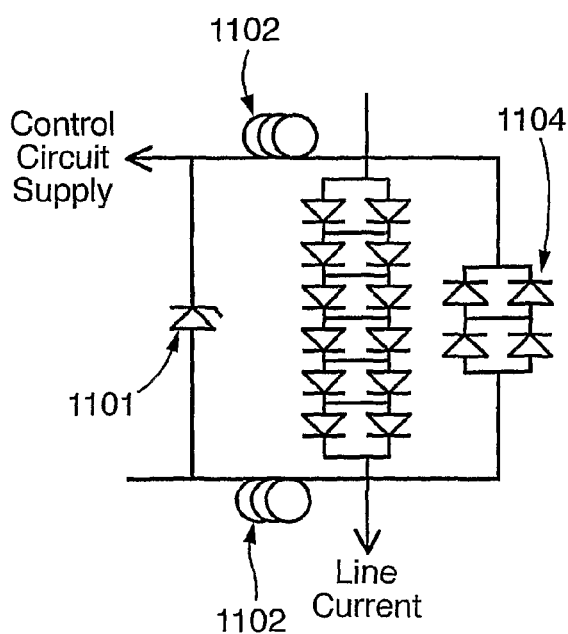
FIG. 11 shows a diode array and clamp Zener arrangement according to the present invention.

In a preferred embodiment, illustrated in FIG. 11, the further features of a low current clamp Zener 1101 and one or more filter coils 1102 may be added to the array of diodes 1103 in order to more accurately simulate the response of the high power Zener diode shown in FIG. 4.

Figure 11A:
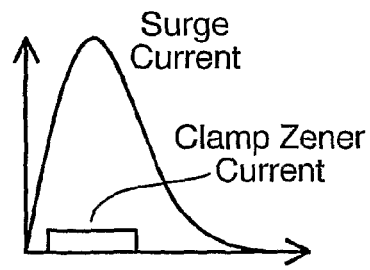
FIG. 11A illustrates surge and clamp Zener current during a fault in the system of FIG. 11.
Figure 11B:
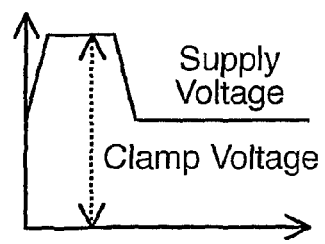
FIG. 11B illustrates the effect of the clamp Zener of FIG. 11 on the voltage across optical control circuitry during a surge current event; and, FIG. 12 illustrates optical repeater control circuitry.

The low current clamp Zener diode 1101 in FIG. 11 is provided to restrict the range of the voltage across the control electronics, and thereby the likelihood of damage to those electronics, in the event of a large surge current, but is tailored to not conduct during normal operation. FIG. 11B illustrates this effect, showing that during a surge event the voltage reaches a maximum at the clamp voltage, but that at the normal operating voltage the clamp Zener has no effect. The filter coils 1102 protect the clamp Zener from high currents during a surge event by providing an inductive barrier, thereby allowing a hold-off period until the surge decays before the clamp Zener is exposed to the current. The magnitude of the hold-off period is determined by the nature of the filter coils. FIG. 11A shows the current through the clamp Zener diode compared with the surge current itself.

The array of rectifier diodes 1103 (and, optionally, the filter coils 1102 and clamp Zener 1101) are effective to provide substantially the same response to a forward surge current as that of the large power Zener shown in FIG. 4 (effectively bearing the surge current and preventing it passing through the control electronics). However, a reverse surge current could not pass through the array of rectifier diodes without causing permanent damage. It is therefore preferable to provide a reverse path 1104 that will not conduct the normal line current or a forward surge current but will bear the current in the event of a reverse surge current. This reverse path 1104 runs in parallel with the rest of the circuit and may contain one or more reverse biased rectifier diodes. In the event of a reverse surge current these reverse biased diodes protect the forward biased array of the rectifier diodes from reverse break down. In embodiments comprising a clamp Zener, this will also bear some of the reverse surge current, though the filter coils will again limit the extent of this. Preferably, a laddered array of at least 2 by 2 reverse biased rectifier diodes is provided on the reverse path in order to provide redundancy in the event of the failure of any one diode (either leading to open or short circuit).

Figure 12:
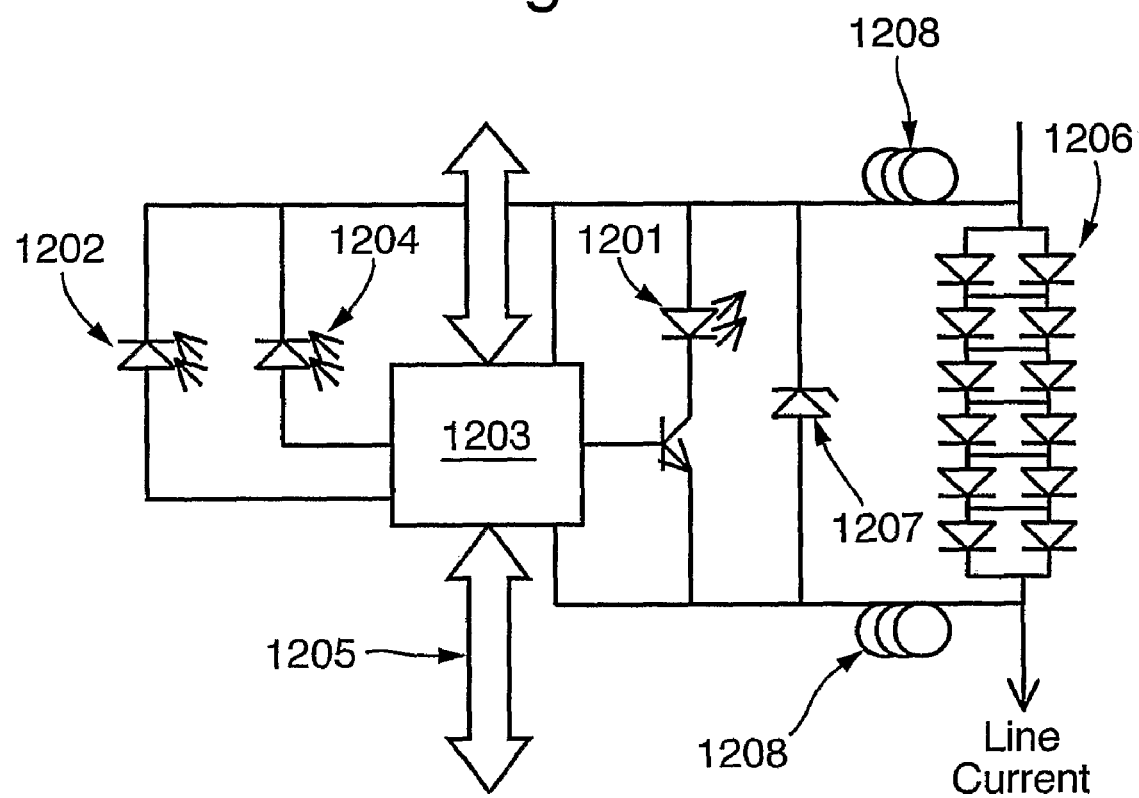

For reference, FIG. 12 shows an example of how the circuitry of FIG. 11 may work in practice to regulate the voltage across optical repeater control circuitry capable of driving a pump laser for use with an optical amplifier. The diode array 1206, and clamp Zener diode 1207, are connected in parallel to various circuitry for controlling the pump laser 1201. The filter coils 1208 are also shown. The pump laser 1201 operates an optical amplifier, and the power of the pump laser may be controlled to adjust the amplifier gain and output power. The laser requires a forward current which is regulated usually by a transistor. By measurement of the back-diode power 1202 built within the pump laser 1201 a controller 1203 may accurately determine and adjust laser current to achieve the desired laser power. Further monitoring is provided by a power monitor diode 1204 coupled to the output of the amplifier. As such the overall amplifier output power may be controlled by adjusting the target pump power. Additionally telemetry signals emanated from shore based signalling equipment may be detected with this diode to allow re-assignment of the power settings (pump or amplifier powers either/or). A control bus 1205 is used to allow communication of control commands through one amplifier to another to help add circuit redundancy and reliability by diversity. This control bus 1205 is usually considered a weak-point with regards to repeater surge protection design. Voltages generated between amplifier modules during surge can stress or damage the semiconductors that make up this control bus.

Figure 7:
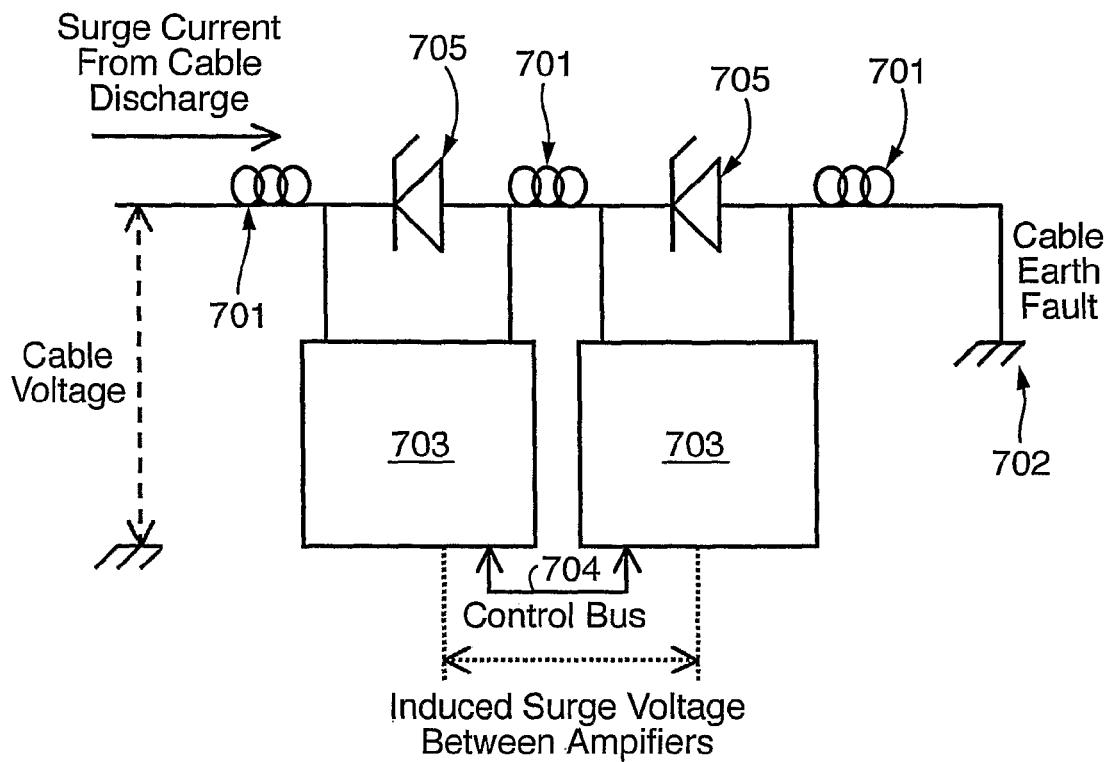
FIG. 7 is a schematic diagram of an optical repeater comprising two optical amplifiers and including stray inductance.

Large surge currents are capable of causing large induced voltages across the repeater. In FIG. 7, a surge current travels from left to right across a repeater to an earth fault 702. The repeater contains sets of optical amplifier control electronics 703 each connected in parallel to a Zener diode 705 as previously shown in FIG. 4. Also depicted is the stray wiring inductance 701 in the system. The majority of the voltage drop (between the earth fault and the cable voltage) occurs across this stray wiring inductance 701. This can cause damage to components of the repeater. In particular, there is typically a control and telemetry bus 704 between the control circuits 703 that is sensitive to large voltages (caused by the stray inductance ($E=L \cdot dI/dT$)).

Figure 7A:
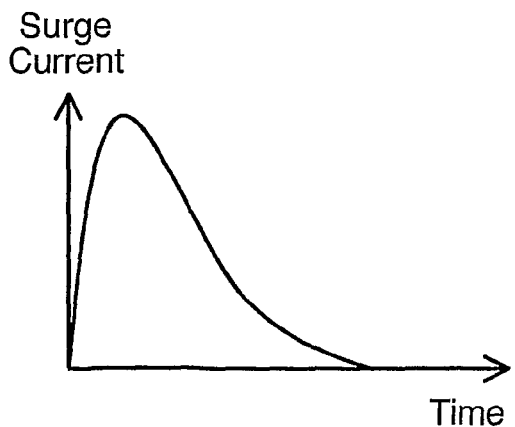
FIG. 7A illustrates the time profile of a surge current passing through the repeater of FIG. 7.
Figure 7B:
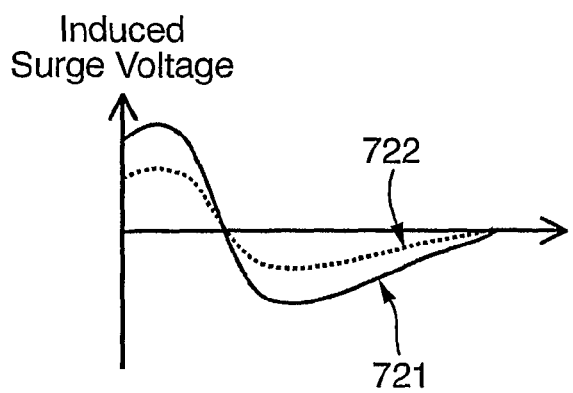
FIG. 7B illustrates the time profile of the voltage induced by the surge current shown FIG. 7A in the repeater of FIG. 7, both across the repeater and between the optical repeaters.
Figure 8:
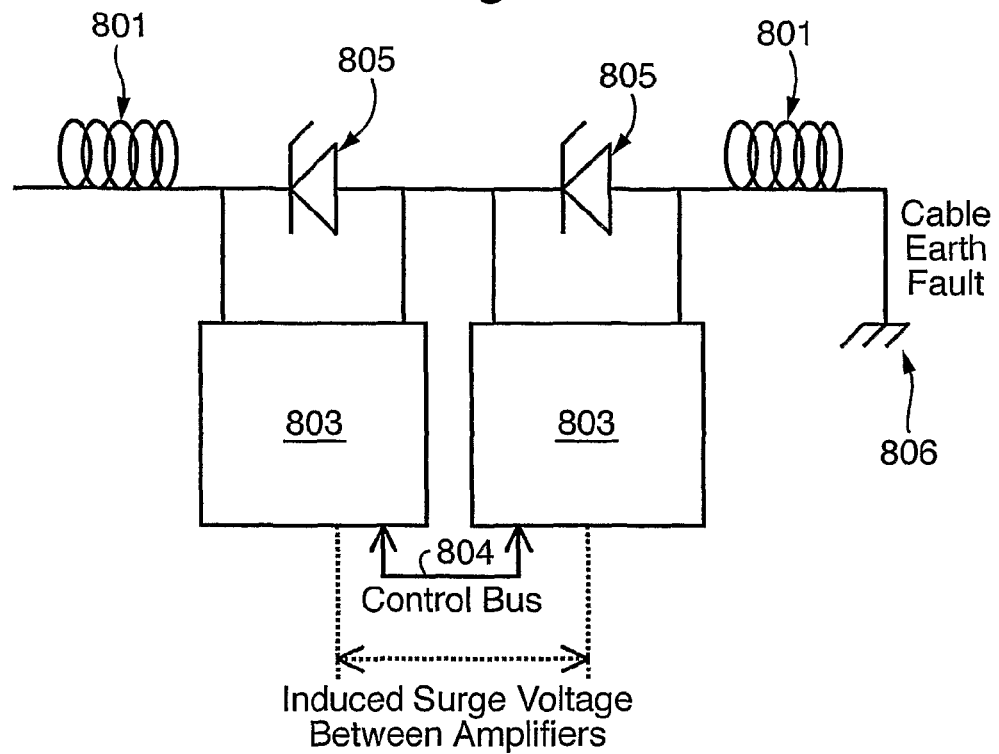
FIG. 8 is a schematic diagram of the optical repeater of FIG. 7, comprising additional surge coils.
Figure 8A:
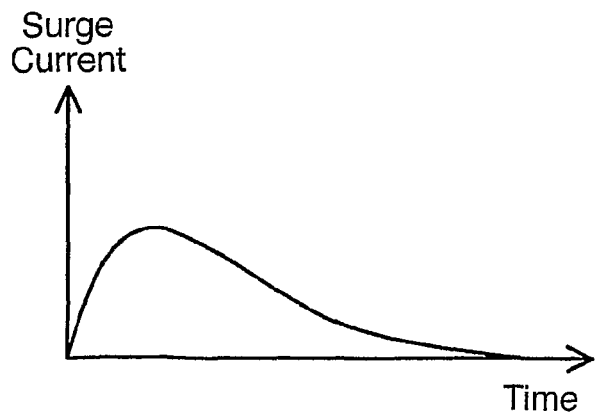
FIG. 8A illustrates the time profile of a surge current passing through the repeater of FIG. 8.
Figure 8B:
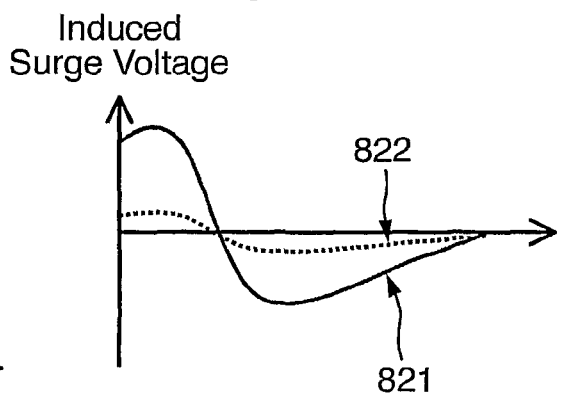
FIG. 8B illustrates the time profile of the voltage induced by the surge current shown FIG. 8A in the repeater of FIG. 8, both across the repeater and between the optical repeaters.

The shape of the surge current over time is illustrated in FIG. 7A, while the induced voltages across the repeater (the full line 721) and between the control circuits 703 (the dotted line 722) are illustrated in FIG. 7B. It is possible to reduce the stray inductance by using thick wires or 'Litz' conductors. However, it is more common to introduce comparatively large inductors at each end of the repeater to reduce the voltage between the control circuits. FIG. 8 illustrates how these two large inductors 801 may be introduced to the system of FIG. 7. Note that the stray inductance is not illustrated in FIG. 8, though the Zener diodes 805, cable earth fault 806, control electronics 803, and control bus 804 are represented. Comparison of FIGS. 8A and 8B with FIGS. 7A and 7B show the effect these inductors 801 have on the current and voltage respectively. FIG. 8A shows that the maximum current is reduced by the presence of the surge coils, as is the rise time of the surge current. FIG. 8B illustrates that, while the voltage across the repeater (the full line 821) remains large the voltage between, the control circuits (the dotted line 822) is reduced significantly.

The surge protection coils 801 are conventionally formed from complex air cored designs (the use of a magnetic core material runs the risk of saturation, thereby negating any inductance benefits). As the coils are required effectively to hold off the entire line voltage (recall that this is typically thousands of volts), suitable voltage clearances are required in the design (of the order of 1 mm per kilovolt at standard temperature and pressure STP). These features are incompatible with providing a compact coil design. Moreover, inductors of this type typically require hand fabrication and are therefore expensive and time-consuming to produce.

In order to overcome the above problems, it is proposed to use a planar coil structure formed within a substrate, such as a printed circuit board (PCB). It is possible to insulate the coil by winding it within a PCB buried layer. In a preferred embodiment, the PCB is formed of the 'Flame Resistant 4' (FR-4) material commonly used in PCBs. The FR-4 PCB substrate acts as a very good insulator allowing the coil to be placed in close proximity to earthed potentials. This design of coil is relatively easy and inexpensive to fabricate when compared to the air-cored coils described above.

Figure 9A:
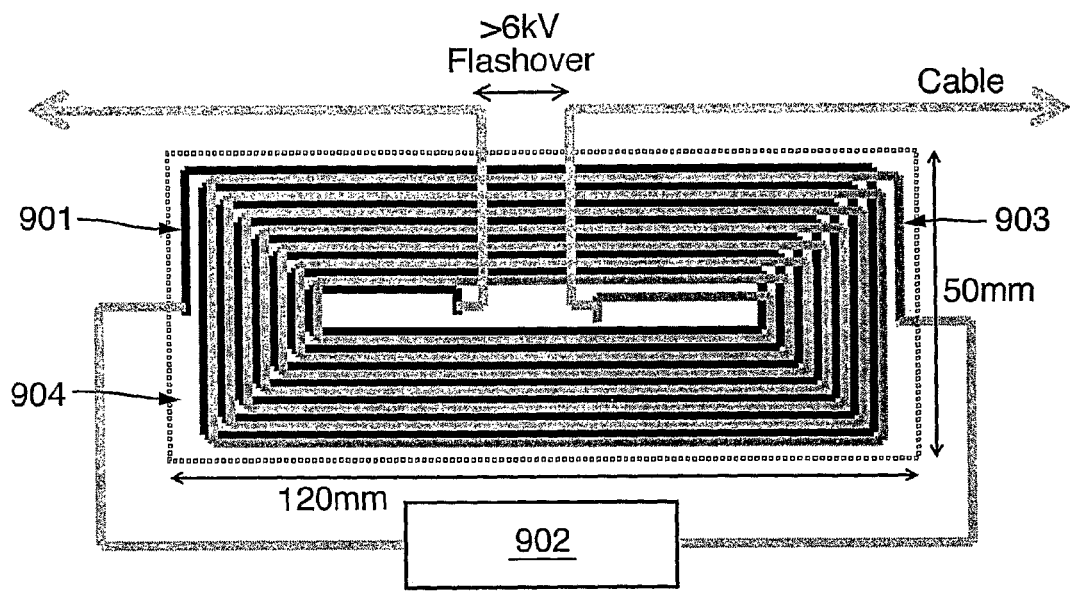
FIG. 9A shows a physical implementation of a coupled compact planar surge coil according to the present invention.

In one preferred embodiment shown in FIG. 9A, the two surge coils depicted in FIG. 8 are fabricated in a single PCB substrate 904. In the forward direction, the current first passes through the first coil 901, then through the repeater electronics 902, and finally through the second coil 903. In the reverse direction, this order is reversed. The two coils, though they are insulated from each other electrically, are magnetically coupled. This means that the inductance provided by each increased. Coil inductance is proportional to the number of turns squared. As such, two identical but magnetically coupled coils will effectively have four times the inductance of one isolated coil. This leads to a reduction is the size requirements for a suitable pair of surge coils. In one preferred embodiment, each coil consists of 22 turns, the dimensions of the substrate are approximately 120 mm by 50 mm, and the measured inductance is around 150 uH. In general, the inductance provided by the coils is preferably over 100 uH, and more preferably between 140 uH and 160 uH.

An additional advantage of the magnetic coupling of the coils is that energy may pass from one coil to the other via the magnetic field. When the coils are connected at the input and the output of the repeater (as in the preferred embodiments) this means that less energy passes through the repeater components themselves in the form of electric current, thereby providing additional protection from surge currents to the repeater.

Figure 9B:
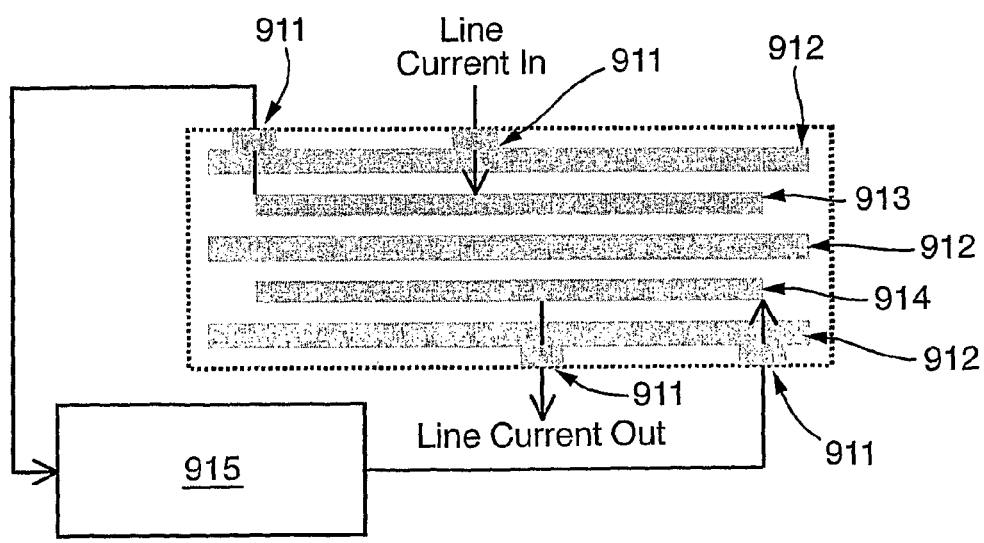
FIG. 9B is an expanded view of the layers in the surge coil of FIG. 9A.

FIG. 9B shows an expanded view of the layers of the component shown in FIG. 9A. Three insulating layers 912 sandwich coils 913/914, while contacts 911 connect the coils to the external cabling and the repeater electronics 915. The outer layers contain vias so that the contacts are in electrical contact with the coils. Note that this diagram is an expanded view and that all the layers are in practice in physical contact such that the coils 913/914 are embedded within (that is entirely enclosed within) the insulating layers 912, and the only access to them is via the contacts 911.

Figure 10:
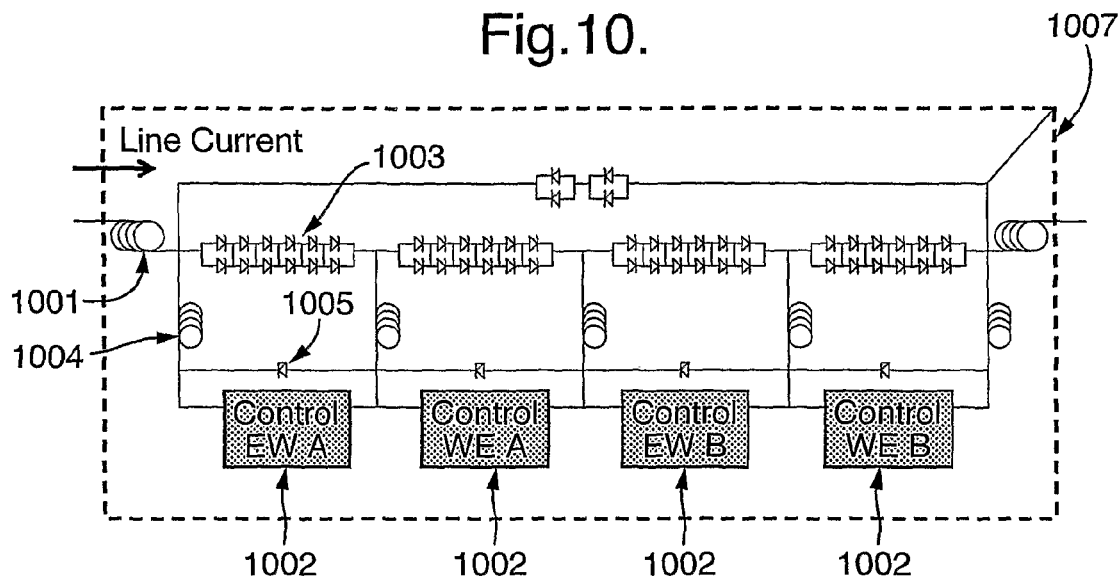
FIG. 10 shows a schematic representation of an optical repeater.

FIG. 10 illustrates a broad schematic diagram of an overall repeater system. Typical line current passes from left to right in this diagram. Surge coils 1001 are placed at the entrance and exit to the repeater, and between them four sets of control electronics 1002 are connected. The current in each control circuit is regulated by the combination of an array of forward biased rectifier diodes 1003, a filter coil 1004 and a Zener clamp diode 1005, as discussed above with reference to FIGS. 5, 6 and 11. A reverse path comprising an array of reverse biased diodes 1006 is provided to handle reverse surge currents. As mentioned previously, this reverse path is not necessary when using the prior art method shown in FIG. 4 as a Zener is capable of handling currents in both directions. FIG.

10 also illustrates the parasitic stray capacitance 1007 due to the case of the repeater. This case capacitance 1007 is due to the pressure vessel metalwork. This is usually over-moulded with polythene insulation and thus forms a capacitance to sea water. It is this case capacitance 1007 that means it is beneficial to incorporate two surge coils, since if only one coil were included there would be an imbalance in the rate at which the case capacitance would discharge between the two fault scenarios shown in FIGS. 2 and 3. The capacitance is electrically connected as shown.

The invention claimed is:

1. An optical repeater comprising one or more optical repeater drive circuits, each comprising:
   a line current path configured to receive line current at an input node, pass the current through the line current path, and pass the line current to an output node, the line current path comprising:
      a forward laddered array formed of a plurality of banks of two or more parallel diodes that are forward biased in a forward direction from the input node to the output node, each diode in each bank of the plurality of banks in the forward laddered array being in direct electrical contact, without any intervening diodes, with at least one diode in at least one adjacent bank of the plurality of banks in the forward laddered array such that current flowing through one of the plurality of banks may be diverted to another of the plurality of banks while in the midst of the laddered array, and such that if any individual diode in the laddered array were to fail either in open or short circuit, the forward laddered array itself does not fail in open or short circuit;
      optical repeater control circuitry connected in parallel with the forward laddered array in the line current path between the input node and the output node; and
   one or more surge coils in series with the one or more optical repeater drive circuits, the one or more surge coils each comprising a substrate formed of an insulating material and first and second magnetically coupled conducting coils embedded within the substrate, wherein the first coil is electrically connected to an electrical input of the optical repeater and the second coil is electrically connected to an electrical output of the optical repeater.

2. An optical repeater according to claim 1, wherein each diode in each bank of the plurality of banks in the forward diode array is in direct electrical contact, without any intervening diodes, with at least two diodes in at least one adjacent bank of the plurality of banks in the forward laddered array.

3. An optical repeater according to claim 1, wherein the substrate is substantially planar.

4. An optical repeater according to claim 1, wherein the one or more surge coils provides an inductance of over 100 uH.

5. An optical repeater according to claim 1, wherein the substrate is a printed circuit board (PCB).

6. An optical repeater to claim 5, wherein the PCB comprises FR-4 insulating material.

7. An optical repeater according to claim 1, wherein at least some of the diodes in the forward laddered array have a forward voltage drop of approximately 0.6 volts.

8. An optical repeater according to claim 1, wherein a forward biased voltage drop of the forward laddered array is at least 3.0 volts.

9. An optical repeater according to claim 1, further comprising a reverse path that conducts reverse surge current.

10. An optical repeater according to claim 9, wherein the reverse path includes a clamp zener diode.

11. An optical repeater according to claim 9, wherein the reverse path includes a reverse laddered array formed of a plurality of banks of two or more parallel diodes that are reverse biased in the forward direction from the input node to the output node.

12. An optical repeater according to claim 1, wherein the one or more surge coils provides an inductance of over 140 uH.

* * * * *